United States Patent [19]

Wawrzyniak et al.

[11] Patent Number: 5,170,678
[45] Date of Patent: Dec. 15, 1992

[54] INDEX TABLE ASSEMBLY

[75] Inventors: Walter W. Wawrzyniak, 34452 Jefferson, #C-39, Mt. Clemens, Mich. 48045; Richard Habarth, Allen Park, Mich.

[73] Assignee: Walter W. Wawrzyniak, Mt. Clemens, Mich.

[21] Appl. No.: 892,406

[22] Filed: May 29, 1992

Related U.S. Application Data

[63] Continuation of Ser. No. 516,455, Apr. 30, 1990, abandoned.

[51] Int. Cl.$^5$ .................. B23B 29/24; B23Q 1/04
[52] U.S. Cl. .................. 74/813 L; 74/813 R; 74/813 C; 269/73
[58] Field of Search ............ 74/813 L, 813 R, 813 C, 74/814, 815, 816, 817, 820, 821, 822, 661; 269/73

[56] References Cited

U.S. PATENT DOCUMENTS

| | | | |
|---|---|---|---|
| 3,483,767 | 12/1969 | Schachte | 74/661 |
| 3,926,421 | 12/1975 | Reiger, Jr. et al. | 74/817 X |
| 4,023,788 | 5/1977 | Herb et al. | 269/73 |
| 4,159,658 | 7/1979 | Parkinson | 74/816 X |
| 4,262,563 | 4/1981 | Brown et al. | 74/821 X |
| 4,417,486 | 11/1983 | Tsukiji et al. | 74/813 R |
| 4,499,792 | 2/1985 | Tanabe | 74/813 C X |
| 4,524,655 | 6/1985 | Waldron et al. | 74/813 L X |
| 4,712,871 | 12/1987 | Tanii et al. | 74/813 L X |
| 4,721,017 | 1/1988 | Jorgensen et al. | 74/813 L |
| 4,771,655 | 9/1988 | Kawamura | 74/820 X |
| 4,837,912 | 6/1989 | Schulze | 73/813 L X |
| 4,884,474 | 12/1989 | Kawata | 74/813 R X |
| 4,890,514 | 1/1990 | Wickham | 74/816 X |
| 4,934,504 | 6/1990 | Torii et al. | 74/813 L X |
| 4,991,463 | 2/1991 | Kawata | 74/817 |
| 4,991,474 | 2/1991 | Thumm et al. | 74/813 L X |
| 5,059,090 | 10/1991 | Bobroff et al. | 269/73 X |
| 5,067,371 | 11/1991 | Sauter et al. | 74/813 L |

FOREIGN PATENT DOCUMENTS

| | | | |
|---|---|---|---|
| 2731706 | 1/1978 | Fed. Rep. of Germany | 269/73 |
| 2457742 | 12/1980 | France | 269/73 |
| 82/03194 | 9/1982 | PCT Int'l Appl. | 74/813 L |
| 83/01031 | 3/1983 | PCT Int'l Appl. | 74/813 L |

OTHER PUBLICATIONS

Cone Drive, Standard Gear Reduction, Ex-Cell-O Corp., Cone Drive Division.

Primary Examiner—Vinh T. Luong
Attorney, Agent, or Firm—Harness, Dickey & Pierce

[57] ABSTRACT

An index table structure and method of indexing where the index table structure includes a table top which is angularly rotatable and has a plurality of cam members around the periphery thereof with each including radially outwardly opening cam recess having a bust locating surface for defining a precisely located indexed position of the table top, a dual motor brake structure for driving the table top between angularly separated indexed positions, a shot pin positioned adjacent the periphery of the table top and having a second locating surface adapted to mate with the first locating surface of the cam recess to locate the indexed table top in a precisely indexed position, a fluid cushion structure for providing a fluid cushion for the table top during rotation; in indexing the table top it is rotated in one direction whereby the shot pin is cam actuated into one of the cam recesses to approximately locate the table top in an indexed position and subsequently the table top is rotated in the opposite direction to engage the first and second locating surfaces on the cam recess and shot pin to precisely locate the table top in one of its indexed positions with the shot pin being wedge locked to prevent the table top from rotating out of position.

14 Claims, 5 Drawing Sheets

INDEX TABLE ASSEMBLY

This is a continuation of U.S. patent application Ser. No. 516,455, filed Apr. 30, 1990, now abandoned.

BACKGROUND OF THE INVENTION

The invention relates to index table assemblies for machine tools and the like and more specifically to an index table assembly having an actuating mechanism for rotating an index table to a plurality of positions and quickly and accurately locating the index table at each position.

In the past, index table assemblies have been such that the associated index tables have normally been rotated in only one direction between indexed positions. Such index table assemblies require that the index table be precisely stopped in the desired indexed position; yet it is desirable that the table be rotated at a relatively high rate of speed for as long as possible to decrease the indexing time between indexed positions. At the same time the rotational velocity of the index table often is prematurely reduced in order to prevent overshoot. In addition, rapid deceleration and abrupt stops can put high stresses on the actuating mechanism of the index table assembly, which may result in improper indexing and/or in early failure of the operative parts.

With prior index table assemblies, the index table has often been supported on roller bearings or the like to relieve friction between the index table and the supporting structure to permit indexing of the table with a conventional drive structure. Such bearings are in permanent contact with the table and may not provide a steady base for such index tables at their indexed positions. Further, such bearings are subject to wear and thus require periodic checking and adjustment or replacement if the required accuracy of most index tables is to be maintained.

Also, some prior index table assemblies have not been provided with a structure for holding the table in an indexed position other than the structure required for initially positioning the index table in the indexed position. In this regard it has been known to use a shot pin assembly to hold the index tables in the desired positions. But such shot pin assemblies were not securely locked and could loosen resulting in inaccurate positioning. Maintaining such prior index tables in their indexed positions has thus been less secure than desirable. Where a separate assembly for holding prior index tables in indexed positions has been provided, it often has been internally buried in the index table structure so as not to be readily available for maintenance or inspection.

SUMMARY OF THE INVENTION

In the present invention the index table is rapidly rotated in one direction towards an indexed position. The actuation of table rotation is stopped near that position with the table slightly overshooting that position. Next the index table is rotated the short distance in the opposite direction to a precise indexed position and is locked in that indexed position. To facilitate rotation and minimize friction the index table is floated on a fluid medium such as air or oil.

In the present invention the index table assembly permits ease of adaptability to different sized tables. At the same time the index table assembly provides means for readily changing or selecting the number of stations to be served.

Therefore, it is an object of the present invention to provide a unique index table assembly whereby the associated table can be quickly rotated towards and past its desired position and then reverse rotated a short distance and precisely located at the desired points.

It is another object of the present invention to provide a unique index table assembly which facilitates the use of different sized tables and also facilitates the selection of various indexing locations.

It is still another object of the present invention to provide a unique index table assembly in which the rotating table is suspended on a fluid (liquid or air) cushion to reduce friction and facilitate rotation.

Other objects, features, and advantages of the present invention will become apparent from the subsequent description and the appended claims, taken in conjunction with the accompanying drawings.

DETAILED DESCRIPTION OF THE EMBODIMENTS

Figure 1:
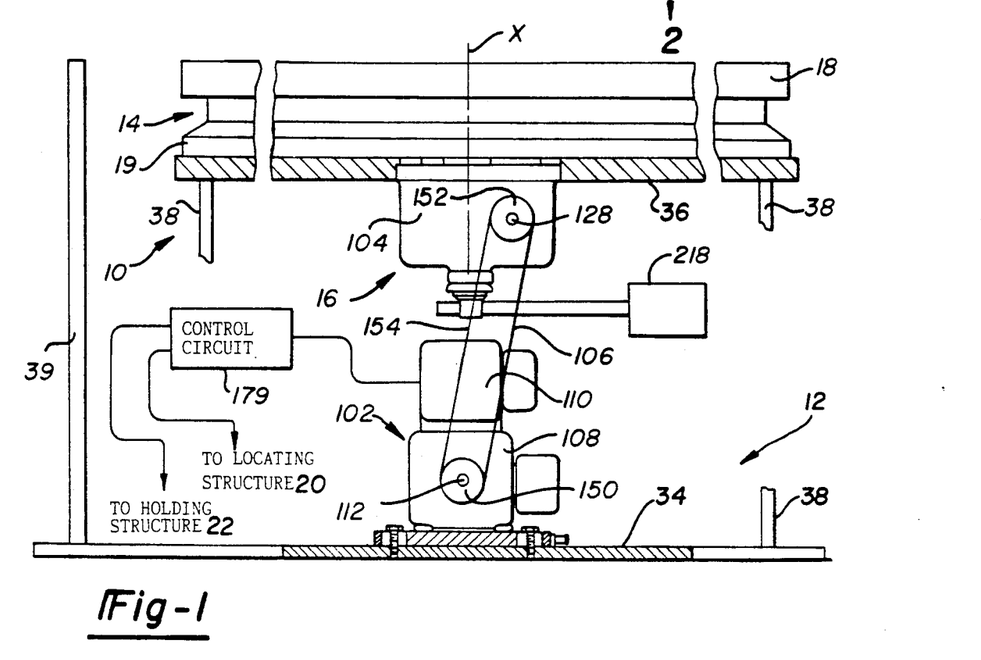
FIG. 1 is a fragmentary side elevational view with some parts shown in section and other parts shown broken away of the index table assembly of the present invention.

Looking now to FIG. 1, an index table assembly 10 includes a base 12 for supporting an associated table subassembly 14 and drive structure 16 for rotating a table top 18 or the table subassembly 14 about a central axis X between circumferentially disposed indexed positions. The table subassembly 14 includes a fixed support member assembly 19 which rotatably supports the rotatable table top 18. As will be seen the table subassembly 14 has a segmented air cushion structure 24 and 26 operative between the support member 19 and rotatable table top 18 whereby the table top 18 can be supported on a cushion of air (or other fluid) during rotation (see FIGS. 3 and 5). The rotatable table top 18 is guided during rotation on a guide structure 27 located on support member 19 (see FIG. 3). Looking now to FIGS. 7-10, a locating structure 20, is provided to precisely locate the rotatable table top 18 in predetermined indexed positions. A holding structure 22 is provided to hold the rotatable table top 18 in the exact indexed positions.

In the embodiment of the invention, as shown in the drawings the table subassembly 14 is generally of an annular construction having an open center 25 extending through the table top 18 and fixed support member 19.

When it is desired to index the table top 18, the holding structure 22 is activated to release the locating structure 20 and the rotatable table top 18 is raised on an air cushion. The table top 18 is then indexed in a clockwise angular direction about axis X relative to the fixed support member 19 to a first position slightly past the desired, exact indexed position and is subsequently slowly rotated in reverse direction the short distance to the exact or precise desired indexed position. The air cushion is then removed and the table top 18 is lowered by gravity and is held by holding structure 22 in a precise, desired indexed position for the procedures that are to be performed thereon. It should be noted that, while in the preferred embodiment shown air is utilized as the fluid or fluid medium providing the desired cushioning, a fluid other than air, i.e. oil, could be utilized; thus the expression fluid or fluid medium as used herein shall be taken in its broadest sense and not restricted to air; it should also be noted that the embodiment shown could be readily adapted to provide for rotation of table top 18 in the reverse or counterclockwise direction.

More specifically, the base 12 includes a bottom plate 34, a top plate 36 and cylindrical side walls 38 and 44 extending between the bottom plate 34 and top plate 36. Suitable additional bracing and strengthening members 40, 42, and 46, provide strength for the base 12 in conjunction with the bottom plate 34, top plate 36 and the cylindrical side walls 38 and 44. Both the bottom plate 34 and the top plate 36 are circular (see FIG. 2). At the same time the locating structure 20 is supported upon a cylindrical support 39 which is spaced radially outwardly from and generally surrounds the table subassembly 14.

Figure 3:
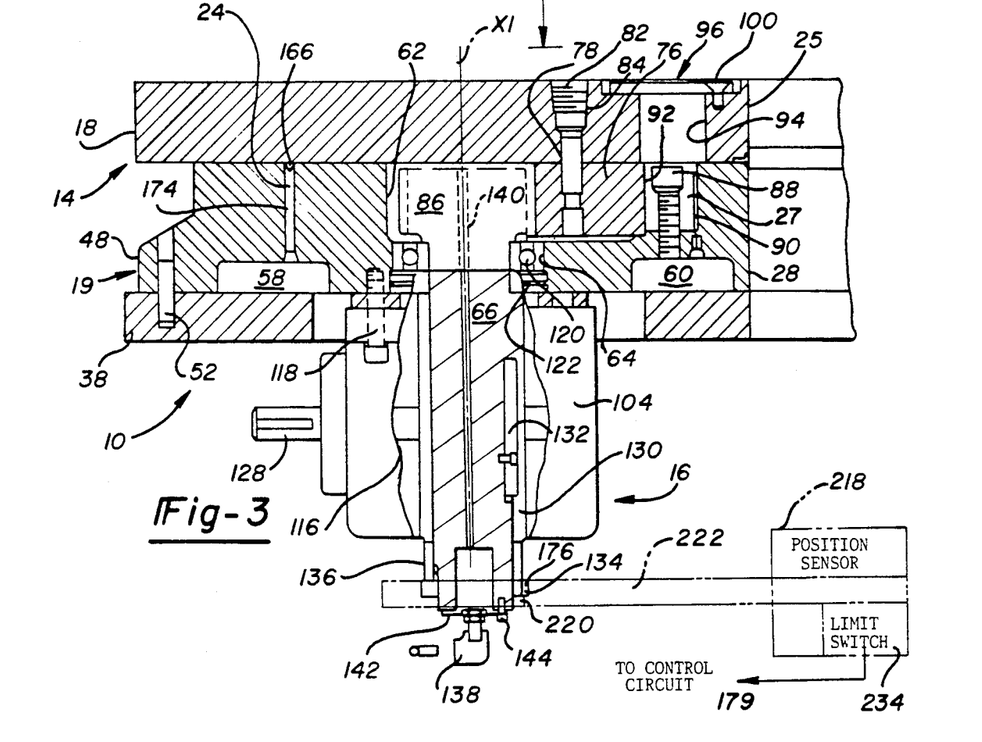
FIG. 3 is a fragmentary, sectional view with some parts shown broken away of the index table assembly of FIG. 1, taken substantially in the direction of the arrows 3—3 in FIG. 2.
Figure 5:
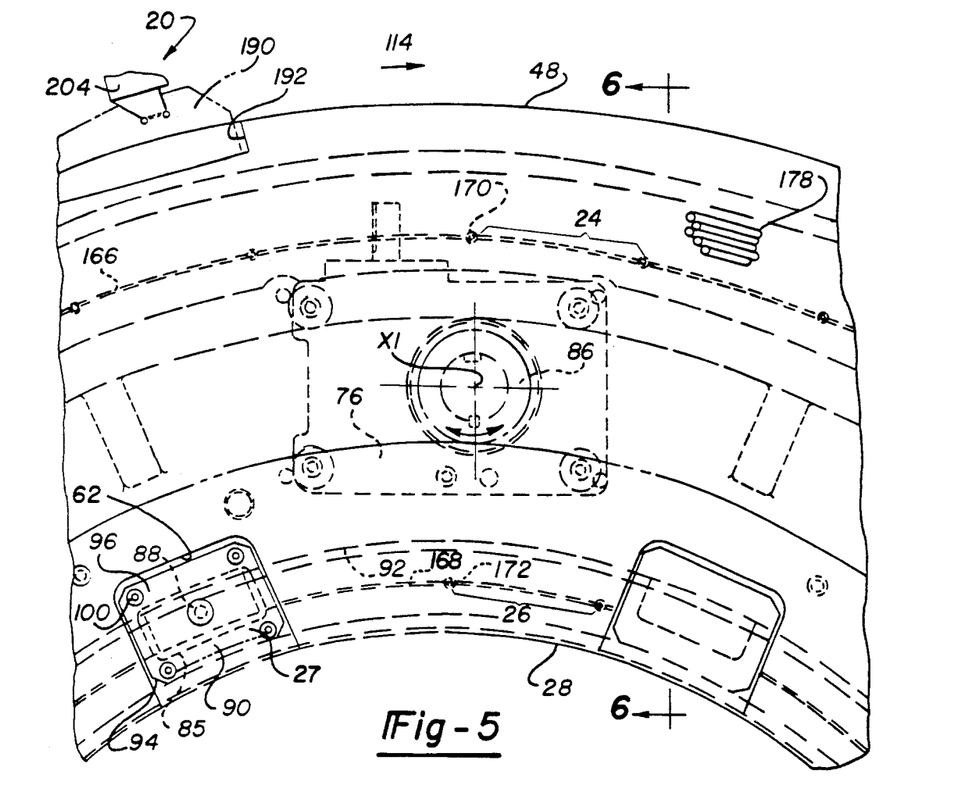
FIG. 5 is a fragmentary top elevational view to enlarged scale of the index table assembly of FIG. 1, taken substantially in the direction of arrow 5 in FIG. 3 and rotated therefrom by 90°.

The fixed support member 19 of table subassembly 14, is annular in configuration and has an inner diameter edge 28 and an outer diameter edge 48 (see FIGS. 3 and 5). The fixed support member 19 is rigidly secured to the top plate 36 of base 12 by dowels 52 and bolts 54, spaced apart circumferentially therearound (see FIGS. 3 and 6); the rotatable table top 18 is mounted on the fixed support member 19 concentrically therewith for relative angular movement with respect thereto about the axis X (FIG. 1).

The fixed support member 19 is provided with two separate annular channels 58 and 60 in the bottom thereof and is provided with an annular recess 62 having the cross sectional configuration, as shown in FIG. 3. An opening 64 is provided for an output drive shaft 66 which extends through the fixed support member 19 along an axis X1 which is parallel with and in spaced relation to the axis X. An outlet opening 68 in annular recess 62 (FIG. 6) cooperates with a lubricant sight gauge 72 and connector pipe 74 respectively and these serve a purpose to be described.

The rotatable table top 18 has a ring gear 76 secured to the bottom thereof by conventional means such as dowels 78 and bolts 80, (see FIGS. 3 and 6) spaced circumferentially thereabout. Removable plugs 82 are threadably located in the top of threaded openings 84 receiving the dowels 78 to provide access to the dowels 78 and to prevent chips and the like from collecting in openings 84.

Ring gear 76, is adapted to mesh with a pinion gear 86 which is part of the output drive shaft 66 and is rotated about the axis X1 to rotate the rotatable table top 18 about the axis X in response to rotation of the pinion gear 86 and the drive shaft 66 about axis X1.

The individual guide means 27 (see FIGS. 3 and 5) include a plurality of angularly spaced wear pads 85 secured in annular recesses 62 by fasteners such as bolts 88. The wear pads 85 are adjustable through the use of shims 90 to exactly locate the inner diameter surface 92 of the ring gear 76 and to thereby establish the axis of rotation X of the index table 14.

The wear pads 85 are accessible through the rotatable table top 18 of the table subassembly 14 through individual recesses 94 which can be accessed upon removal of cover plates 96 secured to the table top 18 by fasteners such as bolts 100 (see FIGS. 3 and 5).

The index table assembly 10 includes the drive structure 16, for the table top 18, which comprises a dual motor brake assembly 102, a speed reduction structure 104 and a belt and pulley structure 106 extending therebetween.

The dual motor brake assembly 102 is of a known structure; the specific design details thereof, do not constitute a part of the present invention and thus these details have been omitted for purposes of simplicity. In this regard the dual motor brake assembly 102 can be of a construction made by Mannesmann Demag of Cleveland, Ohio and sold under the name Micro-Speed and depicted in the catalog titled Industrial Drives dated Oct. 1, 1985.

Thus the dual motor brake assembly 102 and necessary structure therebetween are operative for selectively driving an output shaft 112 in opposite directions as required. The motor brake assembly 102 includes main and auxiliary motors 108 and 110, respectively. The main motor 108 combines a brake assembly and motor. The main motor 108, of the known construction noted, has a tapered or conical air gap between the stator and rotor (not shown) which permits the stator and rotor to shift axially slightly with respect to each other to run or brake positions. When the main motor 108 is energized, an axial component of the magnetic field overcomes the force of a brake spring and pulls the rotor end of the motor brake assembly into the stator, releasing the brake whereby the rotor of motor 108 can rotate to thereby rotate output shaft 112 in one direction. When the motor 108 is de-energized, the brake spring pushes the brake end of the brake assembly into a braking surface, stopping the motor 108.

Figures 9, 9A, 10:
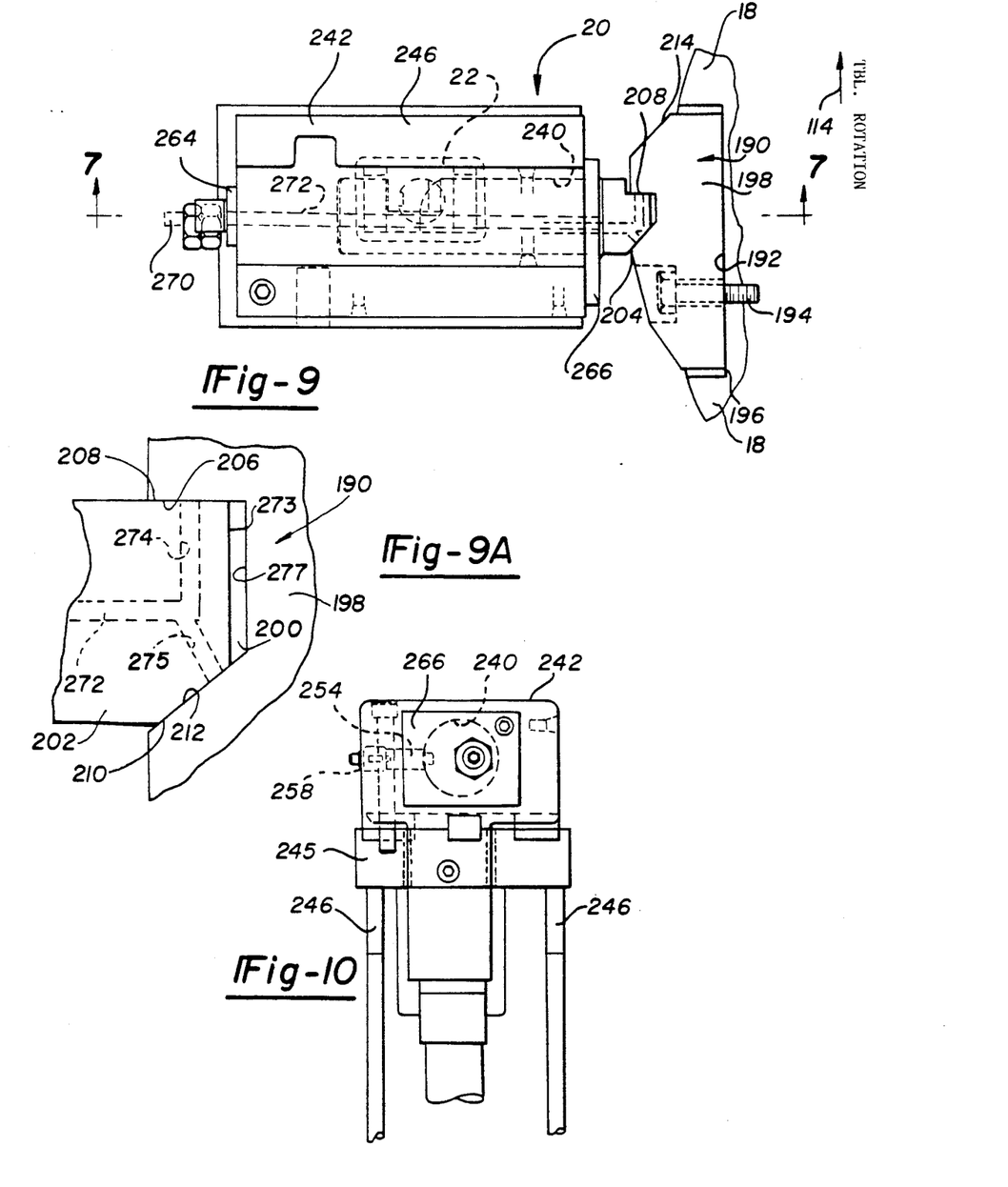
FIG. 9 is a top elevational view of the locating and holding structure of FIG. 7, taken substantially in the direction of arrow 9 in FIG. 7.
FIG. 9A is a fragmentary view to enlarged scale depicting the engagement of the outer end of the shot pin of the locating structure in relation to an associated cam recess.
FIG. 10 is a fragmentary elevation view of the locating and holding structure of FIG. 7, taken in the direction of arrow 10 in FIG. 7.

In operation of the motor brake assembly 102, the main motor 108 is utilized to drive the rotatable table top 18 in one direction such as the clockwise direction indicated by the arrow 114 in FIGS. 5 and 9 between one desired indexed position and a subsequent approximate indexed position; at the approximate indexed position, the brake of main motor 108 is actuated to halt the angular rotation of the rotatable table 18.

Subsequently, the auxiliary motor 110 is actuated to rotate the rotatable table 18 in the opposite direction into the final exact desired indexed position; once that location has been reached the auxiliary motor 110 is deactuated and the reverse rotation of the rotatable table 18 is stopped.

The speed reducing structure 104, (see FIG. 3) includes a housing 116 secured to the fixed support member 19 by fasteners such as bolts 118. Housing 116 supports the output drive shaft 66 having the pinion 86 on the upper end thereof for rotation in a bearing 120. An annular sealing member 122 having O-ring seals around the inner and outer peripheries thereof is provided between the bearing 120 and the upper end of the housing 116.

An input drive shaft 128 extends through the housing 116 transversely to and in spaced relation to the vertical output drive shaft 66 and is mounted for rotation in the housing 116. Gearing such as a worm and worm gear, details not shown, between the input drive shaft 128 and the output drive shaft 66 of the speed reducing structure 104 can be provided to drive the output shaft 66 at a desired reduced speed on actuation of the motor brake assembly 102 through the belt and pulley structure 106.

As shown in FIG. 3, the worm gear 130 is secured to the output drive shaft 66 by convenient means such as the key 132. A locking nut 134 is provided on the lower end of the drive shaft 66 and a spacer 136 is provided between the worm gear 130 and the nut 134 in the speed reducing structure 104. Spacer 136 permits the use of the same drive shaft 66 with housings, such as 116, of different sizes thereby accommodating speed reducing structures, such as 104, of different sizes.

A lubricating fitting 138 is provided to pass lubricant to the index table assembly 14 through the axial opening 140 in the drive shaft 66 (FIG. 3). Lubricating fitting 138 is secured to the bottom of the drive shaft 66 by a mounting plate 142 and the bolts 144.

The speed reducing structure 104 is of a known construction and since the details thereof do not constitute a part of the present invention they have been omitted for purposes of simplicity. The speed reducing structure 104 can be of a type manufactured by Ex-Cell-O Corp. Cone Drive Div. and as illustrated in the catalog titled Standard Single Reductions dated April, 1980.

Figure 2:
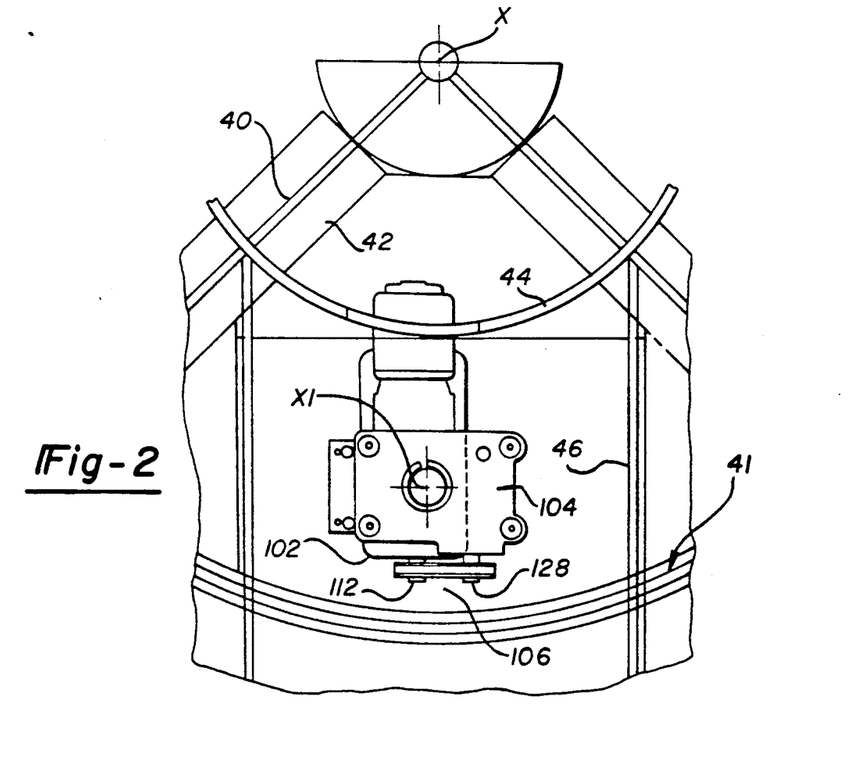
FIG. 2 is a fragmentary top elevational view of the index table assembly of FIG. 1, taken substantially in the direction of arrow 2 in FIG. 1.

As pointed out above and as shown in FIGS. 1 and 2, the speed reducing structure 104 is driven by the dual motor brake assembly 102 through the pulley and belt structure 106; the structure 106 includes a drive pulley 150 and driven pulley 152 secured to the motor drive shaft 112 and input shaft 128, respectively, by conventional means, not shown; the endless belt 154 extends between and drivingly connects the pulleys 150 and 152.

Figure 6:
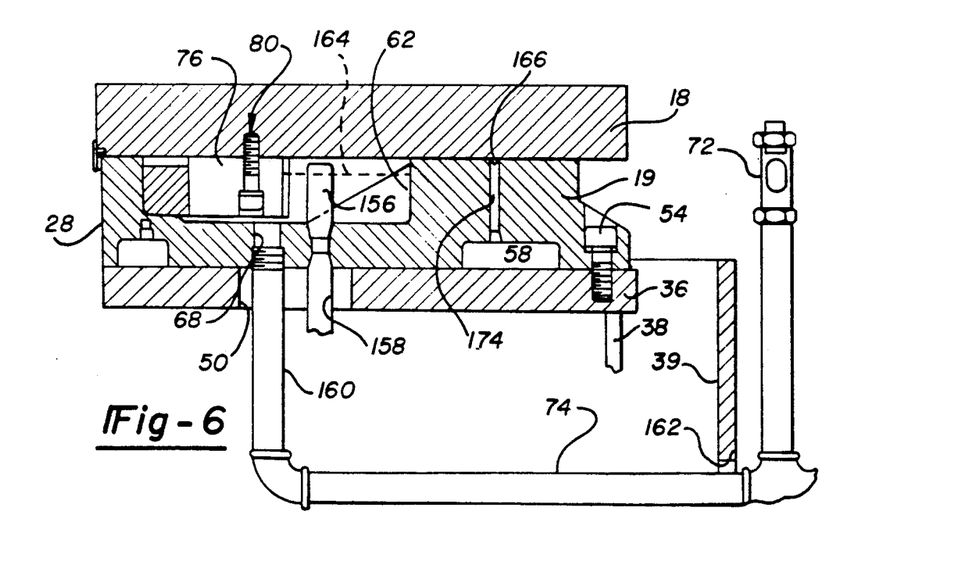
FIG. 6 is a fragmentary, sectional view of the index table assembly of FIG. 1, taken substantially in the direction of the lines 6—6 in FIG. 5.

Looking now to FIG. 6, the recess 62 in the fixed support member 19 is filled with oil to lubricate the table subassembly 14 during rotation of the rotatable table top 18 via the pinion 86 in mesh with the ring gear 76. An overflow tube 156, is provided to drain any excess lubricant from the recess 62 to the drain pipe 158.

The lubricant sight glass 72, (see FIG. 6), is connected through piping 160 to fluid communicate with the recess 62 through the opening 68 in the support member 19 of the index table subassembly 14. As shown, piping 160, which is connected to piping 74, extends through an opening 162 in the cylindrical support 39. Accordingly, the operator is provided with a visual indication of the level 164 of the oil in the recess 62 by the sight glass 72 which is located conveniently at a position radially outwardly of the base 12 and table subassembly 14.

The cushion or bearing on which the rotatable table top 18 of the table subassembly 14 floats during rotary movement thereof relative to the fixed support member 19 is provided through two small annular grooves 166 and 168 in the top of the support member 19. The annular grooves 166 and 168 are concentric and are spaced apart radially. The grooves 166 and 168 are divided into angular segments by plugs such as plugs 170 and 172, spaced angularly therearound (see FIG. 5).

The angular segments of the grooves 166 and 168 are provided with pressurized air resulting in the creation of a fluid cushion or bearing medium; the fluid can be air or oil fed through passages such as passages 174 extending through the support member 19 (see FIGS. 3 and 6). The passages 174 are individually connected to a source of air or other fluid medium under pressure, not shown, through conduits 178, which are positioned in the recesses 58 and 60 in the bottom of the support member 19.

Thus, in operation, when air is passed through conduits 178, it passes upwardly through the passages 174 and into the segments 24, 26 of the grooves 166 and 168, respectively, to lift the rotatable table 18 from the support member 19 and float it on an air cushion. Rotation of the table top 18 with respect to the support member 19 is thus accomplished substantially friction free. Further, due to the circumferentially, generally equally spaced segments 24, 26 of the annular grooves 166 and 168 and individual feeding of the passages 174 from the conduits 178, the air cushion is substantially uniformly distributed around the circumference of the lower surface of the table top 18.

Control of the indexing of the table subassembly 14 is effected through the locating structure 20 and the locking or holding structure 22; an associated electrical control circuit 179 is operatively associated with the dual motor brake assembly 102, the locating structure 20 and holding structure 22 and is of a construction within the purview of one skilled in the art and since the details thereof do not constitute a part of the present invention these have been omitted for purposes of simplicity.

Figure 7:
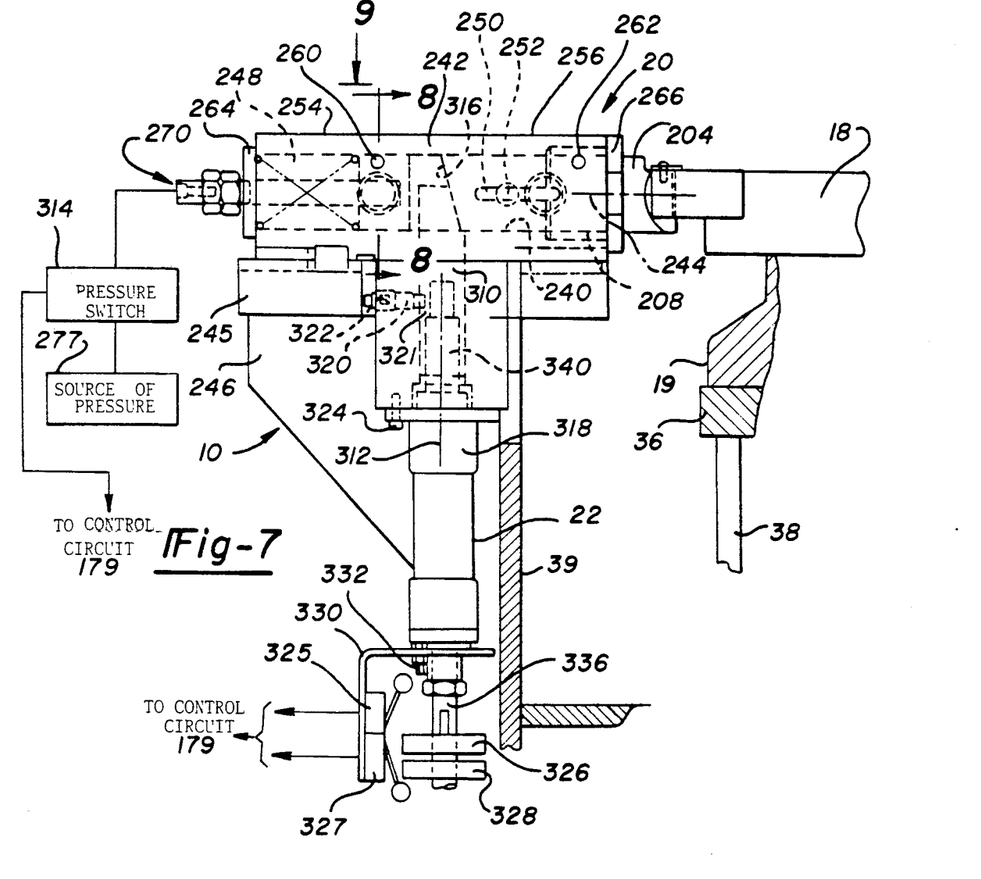
FIG. 7 is a fragmentary sectional view to enlarged scale of a locating and holding structure of the index table assembly of FIG. 1, and taken substantially in the direction of the lines 7—7 in FIG. 9.
Figure 8:
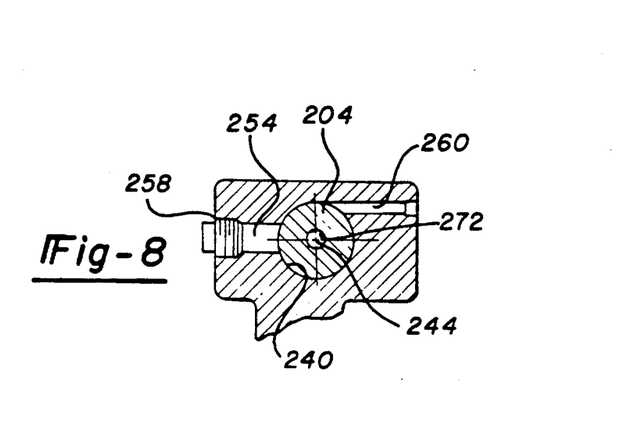
FIG. 8 is a fragmentary sectional view of the holding structure of FIG. 7, taken substantially in the direction of the lines 8—8 in FIG. 7.

Looking now to FIGS. 7–9, the locating structure 20 includes a plurality of cam mechanisms 190 secured to the outer periphery of the upper portion of the rotatable table top 18 in angularly spaced recesses 192 by fastening means such as bolts 194. The exact positioning of the cam mechanisms 190 within the associated recesses 192 is provided by shims 196 located in the recesses 192. In this regard the through holes in the cam mechanisms 190 are oversized for clearance to permit final positioning via the shim adjustment.

Each of the cam mechanisms 190 includes a cam plate 198 having a recess 200 therein, into which the end 202 of a spring biased shot pin 204 extends in operation. The recess 200 has a first locating surface 206 thereon for precisely locating an indexed position of the rotatable table top 18 in conjunction with a complementary or second locating surface 208 on the end 202 of the shot pin 204.

The end 202 of the shot pin 204 has a camming surface 210 thereon operable in conjunction with a corresponding camming surface 212 in the recess 200 and a camming surface 214 on the leading edge of the cam plate 198 to move the shot pin 204 axially thereof as desired on rotation of the rotatable table top 18.

In operation, with the cam plate 198 moving with the rotatable table top 18 (in the direction of the arrow 114 as shown in FIG. 9) and with the shot pin 204 located via its supporting structure 246 in a fixed position adjacent the periphery of the table subassembly 14, the surface 210 of the outer end 202 of the shot pin 204 is first cammed over the surface 214 of cam plate 198 until the end 202 of shot pin 204 passes in front of recess 200 in the cam plate 198; at this time the spring biased shot pin 204 extends into the recess 200.

Rotation of the rotatable table top 18 in the direction shown by arrow 114 is then stopped and the rotatable table top 18 is rotated in the opposite direction to engage the locating surface 206 in the recess 200 with the locating surface 208 of the shot pin 204 positioning the rotatable table top 18 in a precisely indexed position, as determined by the positioning of the cam plate 198.

When it is again desired to index the rotatable table top 18 relative to the support member 19, the table top 18 is again moved in the direction of arrow 114 and the end 202 of the shot pin 204 is cammed out of recess 200 with the camming surfaces 210 and 212 in engagement. The table top 18 is then rotated to the next desired indexed position where the cam mechanism 190 at that next indexed position cooperates with the locating structure 20 in the manner previously described to precisely position the table top 18; since the cam mechanisms 190 are the same in construction a repetition of that construction in the specification and drawings has been omitted for purposes of simplicity.

A position sensor 218, see FIGS. 1 and 3, is operatively connected to drive shaft 66 via a locating ring 220 and actuating rod member 222. The locating ring 220 can be selectively positioned on the drive shaft 66 and has a cam portion 176 which can be selectively located relative to the actuating rod member 222. Actuation of the rod member 222 actuates a limit switch 234, which is operative with electrical control circuit 179 to effect actuation of the dual motor brake assembly 102 as required in the operation of the index table assembly 10, as discussed below. Thus the locating ring 220 can be selectively positioned relative to the positions of the cam mechanisms 190 to sense the approach of each of the cam mechanisms 190 to the locating structure 20 sufficiently in advance to provide a signal to the electrical control circuit 179 whereby the dual motor brake assembly 102 will be actuated to initiate braking and deceleration of the table top 18 before the shot pin 204 is located in the cam recess 200. Note that since the cam mechanisms 190 are located equally circumferentially about the table top 18 only a single such position sensor 218 is required and hence only one adjustment is needed to accommodate the plurality of cam mechanisms 190 as each approaches the single locating structure 20. The control circuit 179 where necessary can be set to actuate the motor brake assembly 102 after receiving one or more signals from the limit switch 234. Also the electrical control circuit 179 will respond to the positioning of the shot pin 204 in the cam recess 200 to initiate reverse rotation of the motor brake assembly 102 to locate the table top 18 in its final desired position with pin surface 208 and recess surface 206 engaged. At the same time, as will be seen, the shot pin 204 will be locked in the index position until initiation of the next operating cycle.

Other types of apparatus could be used such as a timing belt and appropriate gearing or a position sensor such as a proximity switch like device for detecting a preselected number of pulses relative to a multiple grooved ring on drive shaft 66.

The shot pin 204 extends through an opening 240 in a housing 242 for reciprocal movement on its longitudinal axis. Housing 242 is positioned on mounting plate 245 supported from the cylindrical support 39 on brackets 246. Shot pin 204 is urged outwardly from opening 240 and housing 242 by spring means 248, as shown in FIG. 7. Rotation of the shot pin 204 about its axis 244 is prevented by a pin 252 in a slot 250.

Undesired transverse movement of the shot pin 204 within the opening 240 during reciprocal movement of the shot pin 204 along axis 244 is prevented by means of the members 254 and 256 located radially with respect to the shot pin 204 and held in position by plugs 258 (see FIG. 8). The shot pin 204 can be lubricated through passages 260 and 262 in the housing 242.

Shot pin 204 is secured in the opening 240 in the housing 242 at opposite axial ends by means of end plate 264 and bushing 266. The bushing 266 is provided in the outer end of the opening 240 in the housing 242 to guide the shot pin 204 in its reciprocal movement.

An air fitting 270 connected to a pressure switch 314 extends through the end of shot pin 204 to provide pressurized air from pneumatic source 277. In this regard, the shot pin 204 is provided with an axially extending air passage 272 (see FIGS. 8, 9 and 9A), which is in communication with pneumatic source 277 and further communicates with transversely extending orifices 274 and 275.

In operation, the inclined shot pin surface 210 first engages the inclined surface 212 of the cam recess 200 and then urges the shot pin locating surface 208 into engagement with the locating surface 206 of cam plate 198. This wedges the shot pin 204 into recess 200 to positively locate and hold the table top 18 in the desired indexed position. When the surfaces 208 and 210 of the shot pin end 202 engages the mating surfaces 206 and 212 of the cam plate 198, the orifices 274 and 275 are closed to actuate the pressure switch 314, providing an indication to the control circuit 179 that the rotatable table top 18 is in the desired indexed position; in response, the control circuit 179 actuates the holding structure 22 causing the shot pin 204 to be locked in the index locating position. Note that the forward end 273 of shot pin 204 will not be seated against the bottom surface 277 of the cam recess 200 (see FIG. 9A) thus assuring proper location of the table top 18 at the indexed position. Note that only the single orifice 274 need be used in some applications.

The locking or holding structure 22 includes a wedge 310 positioned in housing 242 on a piston rod 340 for reciprocal movement along the axis 312, shown in FIG. 7, in response to actuation of a pressure switch 314. The locking wedge 310 is moveable into or out of opening 316 in the shot pin 204 to hold the shot pin 204 relative to the upper portion of the table subassembly 14 in a precise indexed position upon actuation of a piston and cylinder structure 318 in response to actuation of the pressure switch 314. Rotation of the locking wedge 310 about its axis is prevented by a pin 320 in a slot 321 and the pin 320 is held in place by a plug 322. The piston and cylinder structure 318 is secured to the housing 242 via bolts 324.

Looking now to FIG. 7, cam actuated limit switches 325 and 327 are supported by a bracket 330 secured to the bottom of the piston and cylinder structure 318 by fastener means such as bolts 332. Operatively associated therewith are cam mechanisms 326 and 328 carried by an extension 336 of the piston rod 340 of the piston and cylinder structure 318. The limit switches 325 and 327 are actuated by the cam mechanisms 326 and 328 when the wedge 310 is in a fully up position and when the wedge 310 is in a fully down position respectively.

The switches 325 and 327 are connected to control circuit 179. With the switch 325 actuated, and hence the holding structure 22 actuated, and with the wedge 310 in an up position, this condition is sensed by the control circuit 179 and the indexing of the rotatable table top 18 is prevented. With the wedge 310 in a fully down position so that the switch 325 is no longer actuated and with the switch 327 actuated, this condition is sensed by the control circuit 179 and indexing of the rotatable table top 18 is now permitted; the latter is considered below in the description of the method of indexing the rotatable table top 18.

In the operation of the index table assembly 10, when it is desired to index the rotatable table top 18 between precise angularly spaced positions, the cylinder and piston 318 of the holding structure 22 is deactivated, whereby the wedge 310 is disengaged from the shot pin 204 and returned to a lowered position, deactuating the limit switch 325 and actuating the limit switch 327.

Actuation of the limit switch 327 is sensed by control circuit 179 and this will permit energizing of the dual motor brake assembly 102. Actuation of the limit switch 327 will also activate the air cushion apparatus, whereby the rotatable table top 18 is lifted above the fixed support member 19, so that it may be rotated substantially friction free on an air cushion. At the same time, the main motor 108 is energized to drive the table top 18 in the direction of arrow 114, as shown in FIGS. 5 and 9, to cam the shot pin 204 out of the recess 200 in the cam plate 198 at the prior, desired indexed position.

The rotatable table top 18 is then rotated to an approximate new desired indexed position and the shot pin 204 is cammed over the cam plate 198 at the next desired indexed position through engagement of the surfaces 212 and 214 on the cam plate 198 and shot pin 204, respectively. When the shot pin 204 is opposite the recess 200, the shot pin 204 will move into the recess 200 under the urging of the spring bias means 248. At this time, the rotatable table top 18 overshoots the desired new indexed position by a small amount.

At or prior to that time, the cam portion 176 of locating ring 220 moves the actuating rod 222 to activate the limit switch 234. Actuation of the limit switch 234 is sensed by the control circuit 179 which causes the deenergization of the main drive motor 108 and consequent braking action to bring the rotatable table top 18 to a halt. The auxiliary motor 110 is then energized to drive the table top 18 in the opposite direction to position the table top 18 in the precise required new indexed position as determined by engagement of the position locating surface 206 in the recess 200 with the surface 208 of the shot pin 204.

Engagement of these surfaces closes the orifice 274 in the shot pin 204 to actuate the pressure switch 314 and, in response thereto, the control circuit 179 causes the auxiliary drive motor 110 to be shut off. At the same time, the cylinder 318 is reactivated to drive the wedge 310 into the opening 316 in the shot pin 204 to hold the shot pin 204 in position with the rotatable table top 18 in the precise, new indexed position.

While one embodiment of the index structure of the invention has been considered in detail, it will be understood that modifications thereof and other embodiments are contemplated.

Thus, the index table assembly 10, as shown for example in FIG. 3, is annular and has an inner diameter 28. The center of the index table subassembly 14 is open. In the modified index table assembly 400, shown in FIG. 4, the top portion 405 of the index table assembly 400 is extended radially inwardly to have an inner perimeter 404. A stationary column 402 is provided on base 408 and is located concentrically of axis 410 by pilot portion 412. A cylindrical member 414 is sleeved over the column 402 and is connected to the table top portion 405 by fastener means such as bolts 416. The column 402 is stationary with respect to the bottom portion, not shown, of the table assembly 400 while cylindrical member 414 rotates with the angularly indexable top portion 405 of the table assembly 400.

Figure 4:
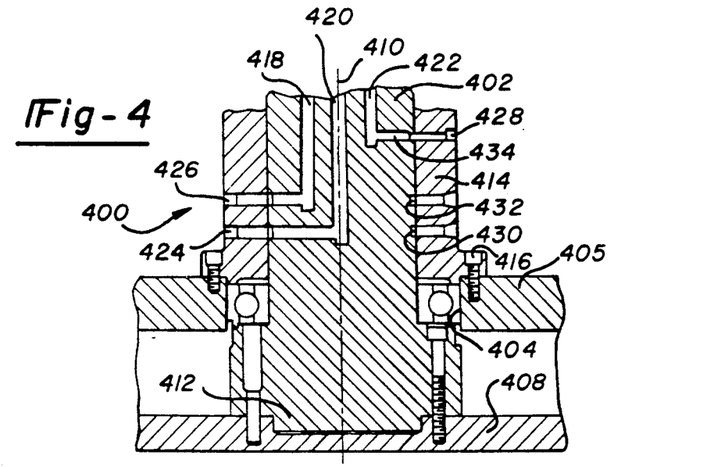
FIG. 4 is a fragmentary, sectional view of a manifold structure for a modified form of the index table assembly of FIG. 1.

In the embodiment shown in FIG. 4, the centrally located column 402 is constructed to pass an actuating medium and lubricant to tool structures, not shown, secured to and indexable with the rotatable top portion 405 of table assembly 400.

In the embodiment of the invention shown in FIG. 4, actuating fluid for tools and the like supported on the table portion 405 is supplied through the passages 418 and 420, while lubricant can be passed to such tools through the opening 422 in the column 402. The corresponding passages 424, 426 and 428 in the cylindrical member 414 communicate with passages 418, 420 and 422 in the column 402 through annular grooves 430, 432 and 434 in the column 402 which are in communication with the respective passages in any angular position of the cylindrical member 414 relative to the column 402.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. An index table assembly comprising an index table having an axis of rotation, drive means connected to said index table for driving said index table in one direction about said axis of rotation and stopping said index table at a first position proximate to but past a preselected indexed position of said index table and sensing means operably associated with said index table for sensing the location of said index table at said first position and providing a signal to said drive means, said drive means responsive to said signal for subsequently driving said index table in a direction about said axis of rotation of said index table opposite said one direction and stopping said index table precisely at said preselected indexed position.

2. The index table assembly of claim 1 further including lift means operably associated with said index table for lifting said index table on a fluid medium cushion during rotation of said index table for producing substantially friction free rotation of said index table about said axis of rotation.

3. The index table assembly of claim 1 further including holding means operably associated with said index table for holding said index table at said preselected indexed position.

4. An index table assembly comprising an index table having an axis of rotation about which said index table may be rotated to preselected indexed positions, guide means for guiding said index table in rotation about said axis of rotation, cam means comprising a plurality of cam members secured to the periphery of said index table at said preselected indexed positions, each of said cam members having a radially extending, outwardly opening recess therein including a first locating surface, said cam means further comprising a shot pin positioned adjacent the periphery of said index table having a second locating surface thereon and engageable with said first locating surface of each of said cam members on rotation of said index table for sequentially locating said index table in each of said preselected indexed positions, drive means for driving said index table in one direction about said axis of rotation, and for stopping said index table at a first position proximate to but past one of said preselected indexed positions with said shot pin extending into said recess in said one of said cam members of said cam means and sensing means operably associated with said index table for sensing the location of said index table at said first position and providing a signal to said drive means, said drive means responsive to said sensed signal for driving said index table in the opposite direction to position said second locating surface on said shot pin against said first locating surface of said recess to precisely position said index table in the associated one of said indexed positions.

5. The index table assembly of claim 4 wherein said index table has an open center.

6. The index table assembly of claim 4 further including bearing means in the center of said index table for supporting a tool structure on said index table.

7. The index table assembly of claim 4 wherein said drive means comprises a ring gear secured to said index table, pinion means in engagement with said ring gear and a combination motor, brake means for driving and stopping said pinion means.

8. The index table assembly of claim 4 wherein said drive means includes separate motors for driving said index table in said one and said opposite directions.

9. The index table assembly of claim 4 further including support means for supporting said index table during rotation about said axis of rotation for reducing friction tending to retard the rotation of said index table.

10. The index table assembly of claim 9 with said support means providing a cushion of fluid medium for said index table.

11. The index table assembly of claim 11 wherein said fluid medium is selected from a group comprising air and oil with said support means providing the cushion in separate angular segments about said axis of rotation of said index table.

12. The index table assembly of claim 4 including holding means for holding said index table in said precise indexed positions.

13. An index table assembly comprising an index table having an axis of rotation about which said index table may be rotated to preselected indexed positions, guide means for guiding said index table in rotation about said axis of rotation, cam means comprising a plurality of cam members secured to the periphery of said index table at said preselected indexed positions, each of said cam members having a radially extending, outwardly opening recess therein including a first locating surface, said cam means further comprising a shot pin positioned adjacent the periphery of said index table having a second locating surface thereon and engageable with said first locating surface of each of said cam members on rotation of said index table for sequentially locating said index table in each of said preselected indexed positions, drive means for driving said index table in one direction about said axis of rotation, and for stopping said index table at a first position proximate to but past one of said preselected indexed positions with said shot pin extending into said recess in said one of said cam members of said cam means and sensing means operably associated with said index table for sensing the location of said index table at said first position and providing a signal to said drive means, said drive means responsive to said sensed signal for driving said index table in the opposite direction to position said second locating surface on said shot pin against said first locating surface of said recess to precisely position said index table in the associated one of said indexed positions, said guide means includes separate centering pads positioned angularly about said axis of rotation of said index table and each of said centering pads being separately moveable relative to said axis of rotation of said index table.

14. An index table assembly comprising an index table having an axis of rotation about which said index table may be rotated to preselected indexed positions, guide means for guiding said index table in rotation about said axis of rotation, cam means comprising a plurality of cam members secured to the periphery of said index table at said preselected indexed positions, each of said cam members having a radially extending, outwardly opening recess therein including a first locating surface, said cam means further comprising a shot pin positioned adjacent the periphery of said index table having a second locating surface thereon and engageable with said first locating surface of each of said cam members on rotation of said index table for sequentially locating said index table in each of said preselected indexed positions, drive means for driving said index table in one direction about said axis of rotation, and for stopping said index table at a first position proximate to but past one of said preselected indexed positions with said shot pin extending into said recess in said one of said cam members of said cam means and sensing means operably associated with said index table for sensing the location of said index table at said first position and providing a signal to said drive means, said drive means responsive to said sensed signal for driving said index table in the opposite direction to position said second locating surface on said shot pin against said first locating surface of said recess to precisely position said index table in the associated one of said indexed positions, holding means for holding said index table in said precise indexed positions, said holding means includes a wedge and actuating means for actuating said wedge with said index table in said precise indexed positions.

* * * * *

UNITED STATES PATENT AND TRADEMARK OFFICE
CERTIFICATE OF CORRECTION

PATENT NO. : 5,170,678

DATED : December 15, 1992

INVENTOR(S) : Walter W. Wawrzyniak et al

It is certified that error appears in the above-identified patent and that said Letters Patent is hereby corrected as shown below:

On the title page,
In the Abstract, line 4, after "including" insert --a--.
In the Abstract, line 5, delete "bust" and substitute therefor --first--.
Col. 4, line 43, before "dated" insert --Product--.
Col. 11, line 50, Claim 11, delete "11" and substitute therefore --10--.

Signed and Sealed this

Twenty-eighth Day of December, 1993

*Attest:*

BRUCE LEHMAN

*Attesting Officer*     *Commissioner of Patents and Trademarks*